(12) United States Patent
Lawler, Jr.

(10) Patent No.: US 7,666,074 B2
(45) Date of Patent: Feb. 23, 2010

(54) MEAT PROCESSING

(75) Inventor: Casimir E. Lawler, Jr., Boise, ID (US)

(73) Assignee: MPSC, Inc., Hudson, WI (US)

( * ) Notice: Subject to any disclaimer, the term of this patent is extended or adjusted under 35 U.S.C. 154(b) by 599 days.

(21) Appl. No.: 11/513,519

(22) Filed: Aug. 31, 2006

(65) Prior Publication Data

US 2008/0085670 A1 Apr. 10, 2008

(51) Int. Cl.
*A22B 3/00* (2006.01)

(52) U.S. Cl. ........................................................ 452/52

(58) Field of Classification Search .................... 452/71, 452/74, 76, 77, 173, 52
See application file for complete search history.

(56) References Cited

U.S. PATENT DOCUMENTS

| | | | |
|---|---|---|---|
| 3,154,079 A | 10/1964 | McKay | |
| 4,053,963 A | 10/1977 | Matheu | |
| 4,190,100 A * | 2/1980 | Wallace | 165/48.1 |
| 4,368,738 A | 1/1983 | Tersteegen et al. | |
| 4,767,411 A | 8/1988 | Edmunds | |
| 4,795,446 A | 1/1989 | Fecht | |
| 4,940,458 A | 7/1990 | Cohn | |
| 4,946,692 A * | 8/1990 | Bernhardt et al. | 426/231 |
| 5,007,336 A * | 4/1991 | Bernhardt et al. | 99/487 |
| 5,137,520 A | 8/1992 | Maxson et al. | |
| 5,215,531 A | 6/1993 | Maxson et al. | |
| 5,364,367 A | 11/1994 | Banks et al. | |
| 5,407,441 A | 4/1995 | Greenbaum | |
| 5,599,317 A | 2/1997 | Hauser | |
| 5,824,002 A | 10/1998 | Gentelia et al. | |
| 5,827,319 A | 10/1998 | Carlson et al. | |
| 5,876,383 A | 3/1999 | Grooters et al. | |
| 5,931,730 A * | 8/1999 | Bernhardt et al. | 452/65 |
| 5,964,656 A * | 10/1999 | Lawler et al. | 452/173 |
| 6,004,302 A | 12/1999 | Bierley | |
| 6,186,987 B1 | 2/2001 | Grooters | |
| 6,196,912 B1 * | 3/2001 | Lawler et al. | 452/173 |
| 6,254,578 B1 | 7/2001 | Grooters et al. | |
| 6,293,958 B1 | 9/2001 | Berry et al. | |
| 6,387,087 B1 | 5/2002 | Grooters | |
| 6,608,561 B2 | 8/2003 | Lawler, Jr. et al. | |
| 6,669,674 B1 | 12/2003 | Macoviak et al. | |
| 6,758,834 B2 | 7/2004 | Grooters | |
| 7,591,718 B2 * | 9/2009 | Crane | 452/52 |
| 2003/0163114 A1 | 8/2003 | Gershowitz | |

FOREIGN PATENT DOCUMENTS

| | | |
|---|---|---|
| WO | WO 96/22703 | 8/1996 |
| WO | WO 98/54974 | 12/1998 |
| WO | WO 2006/010194 | 2/2006 |

\* cited by examiner

*Primary Examiner*—Thomas Price
(74) *Attorney, Agent, or Firm*—Brooks, Cameron & Huebsch PLLC (57) ABSTRACT

The present disclosure includes various method, device, and system embodiments for meat processing. One such method embodiment includes obtaining animal data for an animal selected to have a solution introduced into its circulatory system in a rinsing process and determining an insertion location based on the animal data. This method embodiment also includes establishing a fluid conduit from a reservoir through the insertion location into the circulatory system of the selected animal by inserting a cannula in fluid communication with the reservoir through the insertion location. The method further includes activating flow of a solution from the reservoir through the fluid conduit to introduce the solution into the circulatory system of the animal.

24 Claims, 9 Drawing Sheets

MEAT PROCESSING

BACKGROUND

Treatment of slaughtered animals by injecting a treatment solution into the circulation system of the slaughtered animals provides for improved meat quality and improved yield. Such processing, also called "rinsing," involves the removal of the blood from the animal and the introduction of the treatment solution into the circulatory system. An exemplary apparatus for administering a treatment solution to animals such as cattle, horses, hogs, poultry, deer, buffalo, sheep among others is described in U.S. Pat. No. 5,007,336, and is incorporated herein by reference. An exemplary slaughtering process is described in U.S. Pat. No. 5,964,656, and is incorporated herein by reference.

Treatment of slaughtered animals is complicated by a number of factors. Meat processing centers often have the capacity to process hundreds or even thousands of animals each day. Therefore, high speed processing can be beneficial in order to satisfy the capacity of these large meat processing centers. Automation of the process of injecting a treatment solution can improve processing speed and increase throughput. It is therefore desirable to automate administration of the injection solution during meat processing.

Administration of the treatment solution also should be performed under exacting conditions. For instance, delivery of a treatment solution should occur at a consistent pressure that is high enough to ensure distribution through the entire animal while not rupturing the blood vessels. The treatment process can also be complicated by the desirability of maintaining sanitation of the devices put into contact with the animals and/or retaining the injection nozzle in the animal's circulatory system during treatment.

DETAILED DESCRIPTION

Various method, apparatus, and system embodiments for meat processing are described herein. An example of a method embodiment includes obtaining animal data for an animal selected to have a solution introduced into its circulatory system in a rinsing process. The animal data can include the length, weight, orientation, location, or heart location of the selected animal, among other data.

The animal data can be obtained in various manners. For example, in various embodiments, an optical, thermal, sonic, and/or tactile inspection system, among other inspection systems can be used to measure the animal data, e.g., weight, length, heart location, etc. In some embodiments, animal data for each animal to be rinsed can be measured, while in other embodiments, animal data for a selected animal to be rinsed can be data that is estimated data based on measured data from a sample number of animals.

For example, in some embodiments, a group of animals to be rinsed can be a single type of animal, e.g., pigs, sheep, turkeys, etc., and/or of a particular breed. In such an example, it may be that the animals have similar characteristics. These characteristics may be helpful in locating the insertion location on a selected animal from the group to be rinsed and/or the amount of rinse solution to be used.

For example, it may be that a certain type of animal does not vary significantly in size or weight, among various other characteristics. In such embodiments, some or all of the animal data that is used during the rinsing process can be data that is estimated based on data measured from a sample number of animals. These measured animals may be animals present for rinsing and/or may have been measured to create a database, for example, at the time the rinsing system was created, among other sampling periods.

In various embodiments, the method includes determining an insertion location based on the animal data. For instance, in various embodiments, instructions can be executed to determine an insertion location on the animal based on the animal data, which can be machine readable data. For example, the insertion location can be based on a determined location of the selected animal's heart or femoral artery, the type and/or breed, the length, and/or the weight of the selected animal, among various other animal data.

In some embodiments, the animal data includes an animal type profile. In such embodiments, the animal type profile can include various information associated with a type and/or breed of animal, such as a size, a weight range, and/or generalized animal information, among many other types of information.

For example, the animal type profile can include generalized animal information associated with a particular number of animals of a given species that have been studied, e.g., a number of cows, sheep, pigs, turkeys, etc. As used herein, a group of studied animals refers to one or more samples of animals of a particular type, breed, and/or species for which generalized information associated with various characteristics has been measured and/or can be estimated. Generalized information can include a general circulatory system layout for a particular animal type which can include an estimated location of various circulatory system elements such as a heart location, or various artery locations, for example.

For instance, the animal type profile can include a general heart location associated with a particular type/breed of animal. The general heart location can be based on information from the animal type profile and can vary depending on the breed, size and/or weight, among various other animal characteristics.

In various embodiments, the animal type profile can include a number of different general heart locations for a particular type/breed of animal. For instance, the animal type profile can include estimated heart locations for a number of different weight ranges associated with a particular type/breed of animal.

As used herein, a general heart location can refer to an estimated heart location of an animal based on data associated with a particular group of animals of which the animal is a member. In various embodiments, the animal type profile can be stored on a database which may be located at a meat processing center or at a remote location.

In various embodiments, the animal type profile can be selected based on a particular type/breed of animal to be rinsed. That is, an operator may select an animal type profile from one or more of available profiles depending on the type of animal(s) to be rinsed, a size, a length, etc.

In some embodiments, the generalized animal information can include a general circulatory system layout associated with the particular type and/or breed of animal to be rinsed, e.g., a particular number of animals of a given species that have been studied. The general circulatory system layout can include locations of various organs and/or vessels within the circulatory system associated with a particular type of animal, and can be based on the size, weight, sex or age, among other animal characteristics.

The generalized animal information can also include a prototypical insertion location. A prototypical insertion location can refer to an insertion location to provide direct access to the heart, femoral artery, or other circulatory system location.

In various embodiments, the animal data and an animal type profile for the selected animal can both be obtained. In such embodiments, an insertion location can be determined based on the animal data and the animal type profile.

For example, an animal type profile can include a general heart location of a particular type of animal corresponding to various weight ranges, lengths, etc. As stated above, in some embodiments, the animal data can be the length or weight of the animal selected to be rinsed and may be obtained in various manners (e.g., by manually measuring the length and/or weight or by using an inspection system, among other techniques). In such an example, an insertion location can be determined based on the obtained general heart location and the obtained length and/or weight, among other manners.

In various embodiments, a fluid conduit can be established from a reservoir through the determined insertion location into the circulatory system of the selected animal by inserting a cannula in fluid communication with the reservoir through the insertion location. In some embodiments, the insertion location can be at an opening in the hide or skin of an animal to be rinsed. In some such embodiments, the opening can be a preexisting opening such that the cannula may not have to penetrate the hide or skin prior to entering the circulatory system. The flow of a solution can be activated from the reservoir through the fluid conduit to introduce the solution into the circulatory system of the animal. In various embodiments, the cannula can be retained in the circulatory system with an anchoring mechanism during the rinsing process.

In various embodiments, the animal type profile and/or the animal data are obtained using an automated insertion system. In some embodiments, the automated system can gather data from one or more animals to be rinsed, and then determine an insertion location using the gathered data from one or more animals and/or the animal type profile. In some embodiments, the automated insertion system can determine an insertion location based on generalized animal information associated with a particular number of animals that have been studied.

In various embodiments, a conduit, such as a cannula, can be automatically inserted at the determined insertion location directly into the heart or other suitable location on the animal by using an automatic insertion device. In various embodiments, the automatic insertion device can include an actuator which can deploy the anchoring mechanism upon insertion into the heart to retain the cannula therein.

Various embodiments and/or portions thereof described herein can be performed by software and/or firmware (i.e., computer executable instructions), hardware, application modules, and the like, executable and/or resident on the systems and devices shown herein or otherwise. The embodiments of the present disclosure are not limited to any particular operating environment or to instructions written in a particular programming language. Software, firmware, and/or processing modules, suitable for carrying out embodiments of the present disclosure, can be resident in one or more devices or locations. Processing modules can include separate modules connected together or include several modules on an application specific integrated circuit (ASIC).

Figure 1:
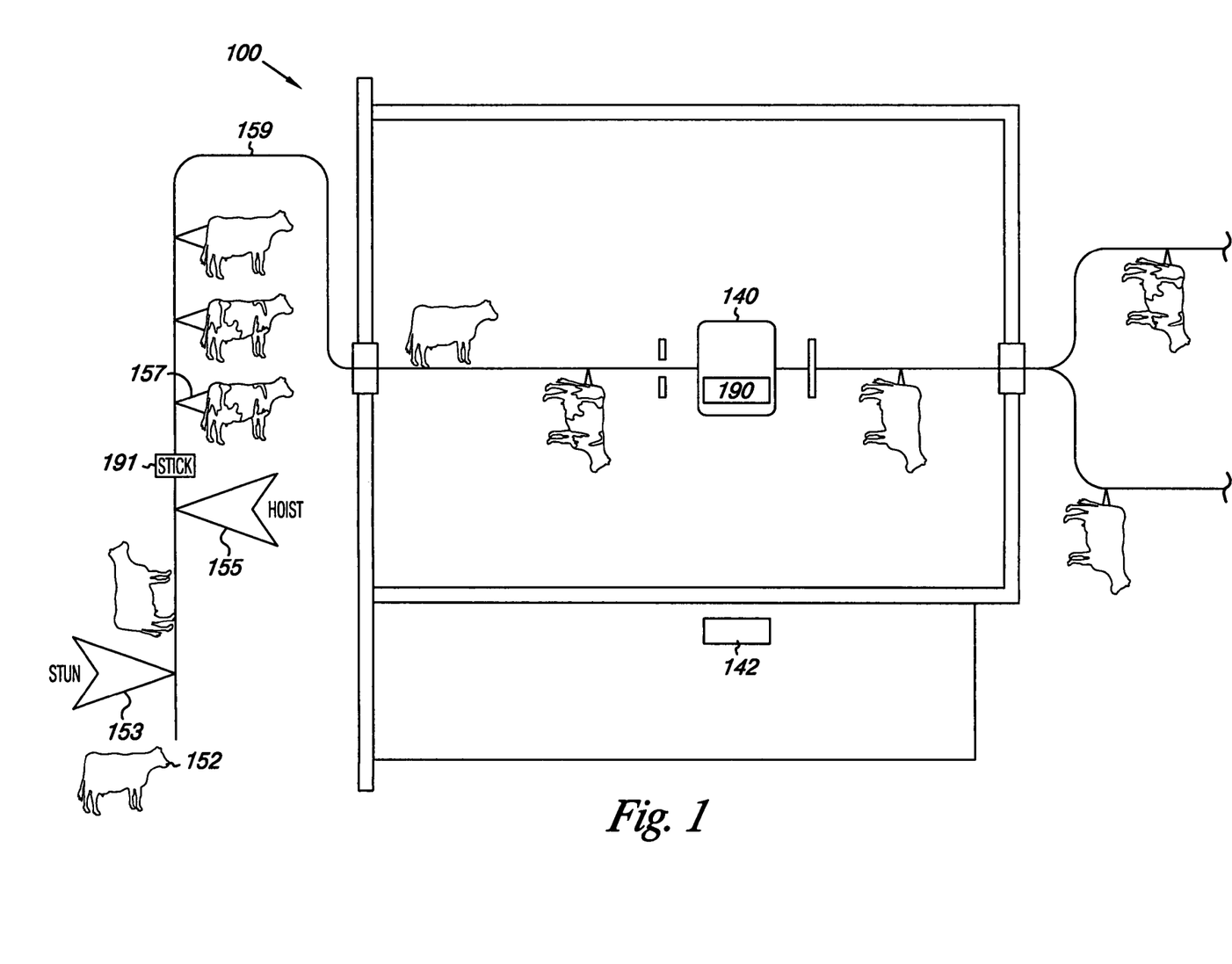
FIG. 1 illustrates a schematic of a system for rinsing animals that includes an automated insertion system according to an embodiment of the present disclosure.

FIG. 1 illustrates a schematic of a system for rinsing animals that includes an automated insertion system according to an embodiment of the present disclosure. The system 100 of FIG. 1 illustrates various stages of meat processing on a processing line. Such processing can be controlled with a computer 142, for example.

Initially, an animal 152 is stunned in a stunning area 153 to render it irreversibly unconscious. A carrier is then used to hold the animal for further processing. In the embodiment illustrated in FIG. 1, the carrier is an overhead rail 159 used in conjunction with a number of shackles 157. The carrier can also be a number of cradles, a number of knock boxes, or a moving table, among other carriers.

In the embodiment illustrated in FIG. 1, the stunned animal is attached to a shackle 157 by one of its rear legs. A hoist 155 can be used to hoist the shackle 157 onto the rail 159 to suspend the animal 152 from rail 159 in an inverted position. In embodiments in which a shackle is used, a cannula (e.g., a cannula as described in FIGS. 3A-5B) can be attached to the shackle. In such embodiments, the cannula can be located so as to provide direct access to the femoral artery, for example.

In various embodiments, the animal 152 can then be conveyed on rail 159 to a bleeding station 191 and then to a rinsing station 140 where residual blood is rinsed from the circulatory system. In some embodiments, the rinsing can occur at other points in the meat processing system.

In various embodiments of the present disclosure, the rinsing station 140 includes an automated insertion system 190. As described in greater detail below, the automated insertion system 190 can include one or more computing devices, an automatic insertion device, and various systems to obtain animal data, to obtain an animal type profile, to determine an insertion location, to insert a cannula into the heart, and/or to activate and control fluid flow through the cannula. In embodiments in which the cannula includes a deployable anchoring mechanism, the automated insertion system 190 can also be equipped to deploy the anchoring mechanism to retain the cannula in the heart during rinsing.

Figure 2:
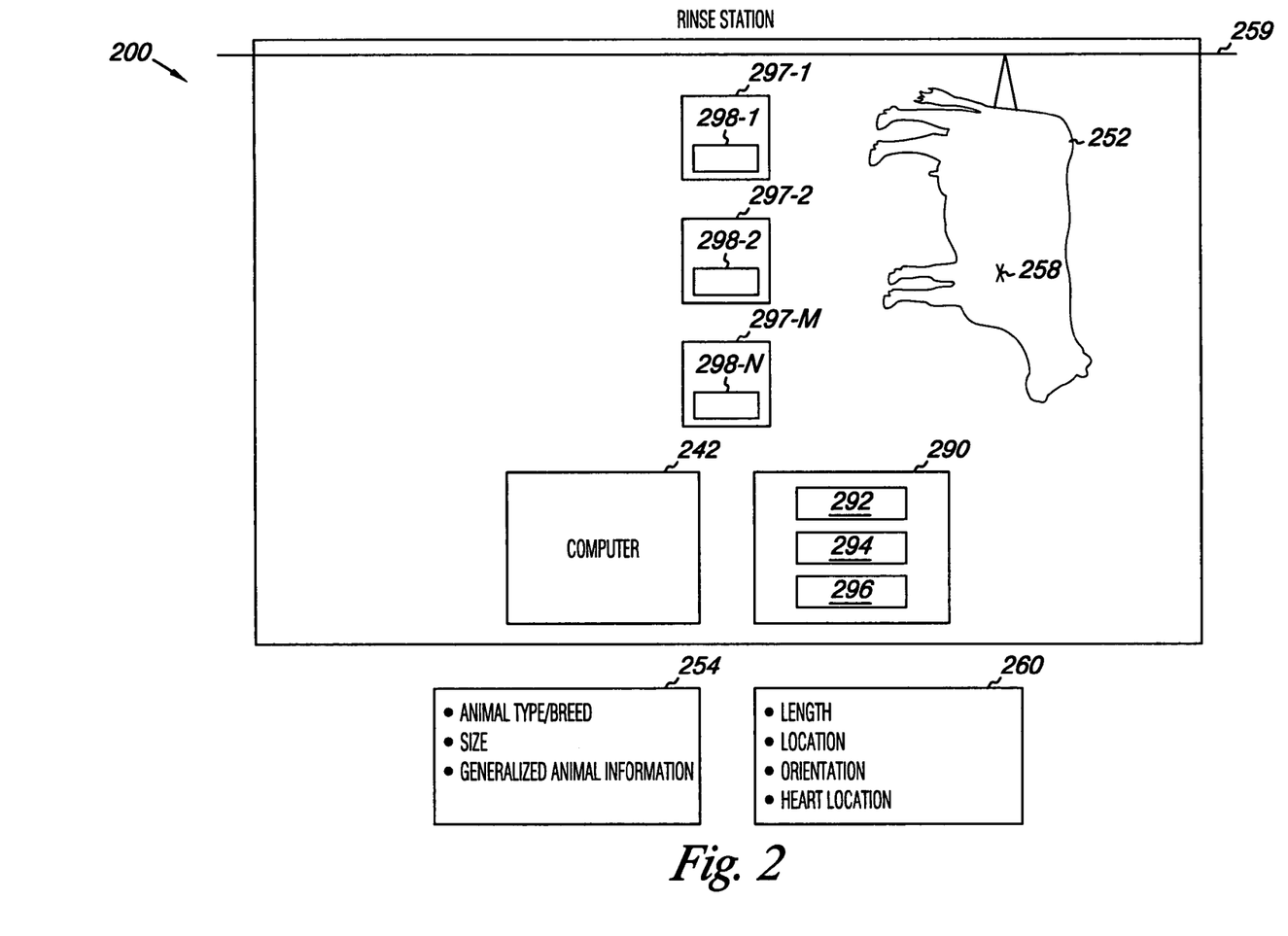
FIG. 2 illustrates a diagram of an automated insertion system for rinsing animals according to an embodiment of the present disclosure.

FIG. 2 shows a diagram of an automated insertion system 200 for rinsing animals 252 according to an embodiment of the present disclosure. In the embodiment illustrated in FIG.

2, the system 200 includes a computing device 242, an automatic insertion device 290, and a number of inspection systems 297-1, 297-2, and 297-M. Each inspection system can include one or more sensors 298-1, 298-2, and 298-N (e.g., an optical sensor, a sonic sensor, a tactile sensor, an audio sensor, a thermal sensor, etc.) that can be used to obtain animal data and/or to determine an insertion location, for example. The indicators "M" and "N" are used to show that system 200 can include any number of inspection systems and any number of sensors. M and N may be equal, but embodiments of the present disclosure are not so limited.

In some embodiments, the system can determine an insertion location based on an animal type profile and/or animal data. For example, in the embodiment of FIG. 2, the insertion location 258 refers to the location on the animal 252 at which the fluid conduit (e.g., a cannula) is to be inserted in order to inject solution into the circulatory system of the selected animal 252.

The insertion location 258 can be located at various locations on animal 252. That is, the location 258 is not limited to the location illustrated in FIG. 2. For instance, the insertion location 258 can be located on the leg, neck, or any other suitable location which can provide access to a suitable circulatory system location (e.g., the heart, the femoral artery, etc.). The insertion location 258 can be determined in various manners. For example, the insertion location can be determined by using animal data (e.g., length, height, weight, and/or girth, among other characteristics) obtained from each individual animal and/or using estimated data based on a sample of animals. For instance, the insertion location can be determined based on an average measured length of a number of sheep from a group of sheep to be rinsed.

In various embodiments, the animal data can include rib location data of a selected animal or general rib location data of a particular type of animal. In such embodiments, the insertion location can be located so as to avoid a rib in order to provide unobstructed access to the heart or femoral artery, among other circulatory system locations. In some embodiments, the insertion location can be located based upon a location of a particular rib of an animal or animal type.

In some embodiments, the location of insertion location 258 can be determined based on information associated with an animal type profile 254. This information can include generalized animal information such as a general heart location and/or rib location of a particular number of studied animals.

An insertion location can include a location on the outside of an animal where a cannula can be inserted in order to provide access to an area of the animal's circulatory system (e.g., the heart or other suitable circulatory system location) targeted to receive the rinse solution. In various embodiments, a prototypical insertion location can be determined by estimating the insertion location by studying the insertion location of a number of animals. In some embodiments, the system determines an insertion location based on the prototypical insertion location.

An animal type profile can include information such as one or more animal types, animal sizes, and/or one or more insertion locations associated with the animal size and/or type, among other information. The animal type profile can be stored on a computing device (e.g., computing device 242 of FIG. 2).

In various embodiments, the animal type profile can include information such as species, breed, type, age, weight range, general circulatory system layout, general heart location, and/or prototypical insertion location among other information. For instance, the general profile information can include data associated with the circulatory system layouts of particular species (e.g., cows, pigs, turkeys, and/or sheep) including data associated with the general location of the animal's heart based on the species. The circulatory system layout can represent a map of an animal's circulatory system and/or portions thereof. The layout can include the general location an animal's heart and/or various arteries into which a rinse solution may be injected, in some embodiments.

Animal data can include data associated with a particular animal to be rinsed. Animal data can include length, girth, width, height, gender, age, species, and/or breed information for the selected animal. Animal data can also include visual data, thermal data, tactile data, and/or sonic data, for example. Such data can be derived from a visual inspection system, a thermal inspection system, a tactile inspection system, and/or a sonic inspection system, among others.

In the embodiment of FIG. 2, the system 200 obtains animal data 260 (e.g., a location of selected animal 252, an orientation of animal 252, and/or a length of selected animal 252). For example, the location of an animal can refer to the place along overhead rail at which the selected animal is positioned. In embodiments in which the carrier includes a number of cradles or knock boxes or a moving table, the location can refer to the particular cradle, box, or portion of the table at which the selected animal is positioned, among other locations.

The orientation of an animal refers to a particular positioning of an animal at a given location. For example, in the embodiment illustrated in FIG. 2, the animal 252 orientation is inverted as it is hung from rail 259.

Obtaining the orientation of a selected animal can be beneficial in some embodiments for providing an appropriate insertion location to reach a desired area in the circulatory system of an animal. For example, an insertion location associated with an animal type profile can vary depending on the orientation of a selected animal.

The orientation can also include a number of components. For example, the orientation can include horizontal, lateral, and/or rotational positioning of the animal.

As mentioned above, in various embodiments, a meat processing system can use one or more inspection systems (e.g., 297-1, 297-2, and 297-M) to obtain animal data associated with a selected animal. The inspection systems can each include one or more sensors (e.g., 298-1, 298-2, and 298-N) that can be used to obtain various types of animal data. For example, in the embodiment of FIG. 2, animal data 260 includes the length of the selected animal 252, the location of the animal, the orientation of the animal, and the location of the heart of the animal.

In various embodiments, an inspection system can determine the location of the heart of a selected animal 252 based on obtaining data from the animal 252 using one or more sensors. This may be accomplished by optical, tactile, thermal, and/or sonic techniques, among others.

An optical system can include an optical sensor, such as a camera or other optical detection device, that can be used to obtain various animal data including length, weight, girth, physical dimensions and/or orientation of the animal or a portion thereof, and/or heart location data of a selected animal. In such embodiments, the optical sensor may be an infrared (IR) sensor, an ultra violet (UV) sensor, or an x-ray sensor, among other types of optical sensors.

A tactile system may include one or more tactile sensors that can obtain data associated with a variety of properties including contact forces when moved over a selected animal. A thermal system can include thermal sensors that can be used to obtain animal data such as the heart location of a selected animal based on the temperature of the heart compared to the surrounding tissue, for example. A sonic system can include audible and/or non-audible sonic sensors capable of obtaining animal data such as a heart location of a selected animal based on a sonic spectrum signature of the heart, for example.

In various embodiments of the present disclosure, system 200 uses one or more inspection systems 297-1, 297-2, and 297-M (e.g., optical, tactile, thermal, and/or sonic) to obtain animal data 260 for selected animal 252. In such embodiments, system 200 can use the animal data to determine an insertion location. In some embodiments, the animal data can be compared with a general heart location and/or a circulatory system layout of a particular group of studied animals to obtain comparison data. In some embodiments, the system can determine an insertion location based on the comparison data and/or a prototypical insertion location from an animal profile.

As illustrated in the embodiment shown in FIG. 2, automated insertion system 200 can include an automatic insertion device 290. In some embodiments, the insertion device can be controlled by a computing device, e.g., computing device 242.

In various embodiments, such as that shown in FIG. 2, insertion device 290 can include a cannula 292, an actuator 294, and a flow controller 296.

In various embodiments, such as that shown in FIG. 2, the computing device 242 can be coupled to the automatic insertion device 290 and/or one or more of the inspection systems 297-1 to 297-M. In such an embodiment, the computing device can have executable instructions storable thereon and executable thereby to operate the insertion device.

In various embodiments, the actuator can be used to automatically deploy the anchoring mechanism upon insertion of the cannula into the circulatory system (e.g., the heart) of the selected animal. In various embodiments the flow controller can activate and/or control the flow of fluid through the cannula and into the circulatory system of the animal.

An automatic insertion device can be used to automatically insert a cannula into the circulatory system of the selected animal upon determination of the insertion location and/or heart location. In many embodiments, such as the embodiment shown in FIG. 2, insertion device 290 can insert cannula 292 directly into the heart or femoral artery, among other suitable circulatory system locations, of selected animal 252 through an insertion location 258.

FIGS. 3A-5B illustrate various cannula embodiments that can be used in an automatic insertion device of automated insertion system. As described further in connection with FIGS. 3A-5B, a cannula (e.g., cannula 292 of FIG. 2) can include an anchoring mechanism (e.g., anchoring mechanism 328) to retain the cannula or a portion thereof in the circulatory system of an animal during the rinse process. As described below, in various embodiments, the anchoring mechanism 328 has a surface for contacting an interior surface of the circulatory system.

In some embodiments, the anchoring mechanism can also serve as a seal to prevent backflow of fluid through the heart of the animal during rinsing. In various embodiments, the rinse solution can be a chilled solution which can cause the heart muscle to contract around the cannula and/or the anchoring mechanism which can also improve retention of the cannula in the heart.

Figure 3A:
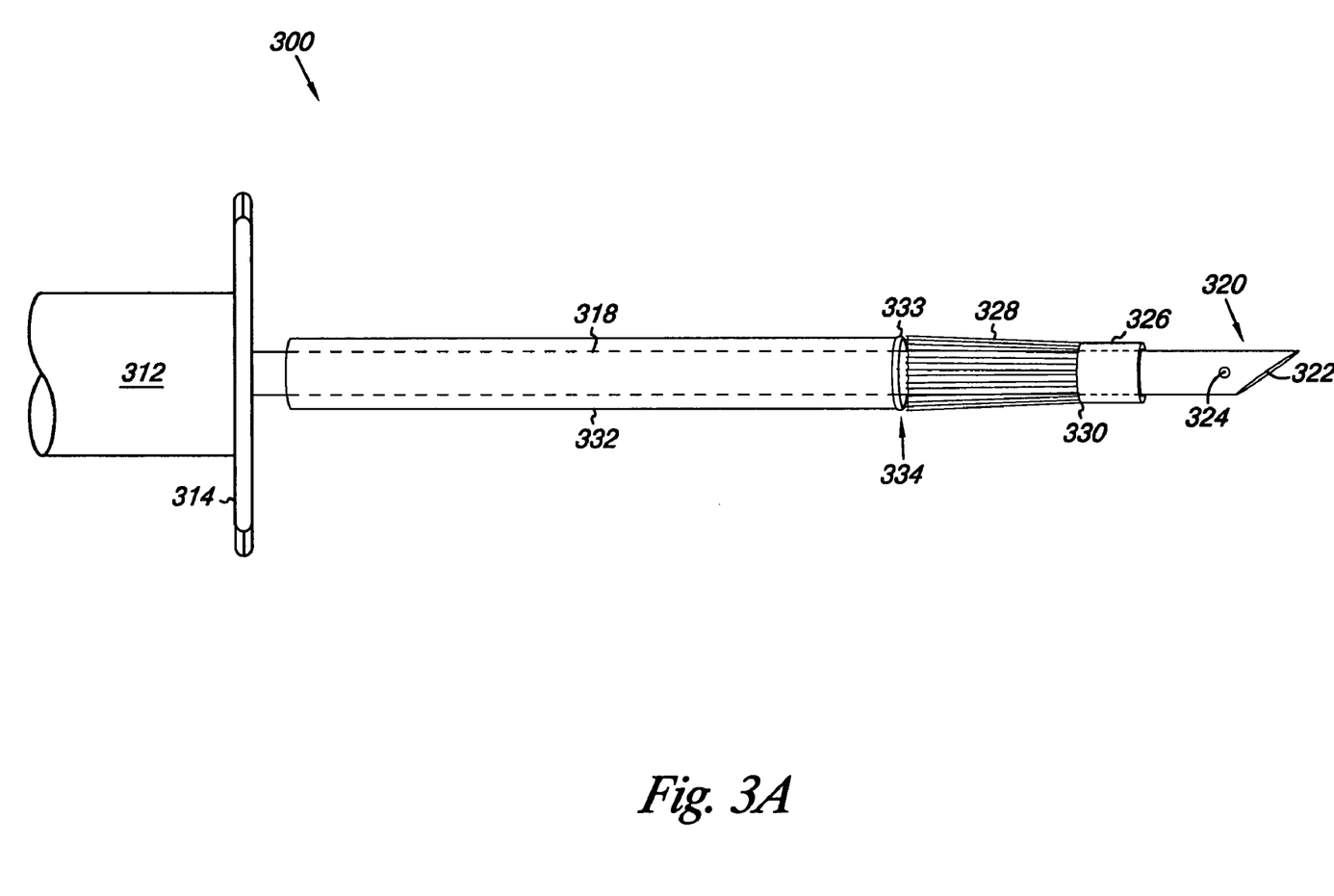
FIG. 3A illustrates a cannula including an anchoring mechanism according to an embodiment of the present disclosure.

FIG. 3A illustrates a cannula 300 including an anchoring mechanism 328 according to an embodiment of the present disclosure. As described herein, the cannula 300 can be operated manually or with an automatic insertion device, as described in connection with FIG. 2.

A cannula can include a valve body. For example, the valve body 312 of FIG. 3 can be a stainless steel cylinder having a diameter on the order of one inch and a length of 4 inches, among other suitable dimensions. The valve body can be removably attached to the cannula and can serve as a connection between a fluid conduit, such as a hose, and a cannula body (e.g., body 318).

The valve body may be designed for manual operation. For example, the valve body may have an integrated valve that is designed for manual operation.

In some embodiments, such as that illustrated in FIG. 3A, a cap 314 can be attached to or integrated with the valve body 312 at or near the insertion end of the valve body. The cap can be of any suitable shape or size. For example, the cap 314 can be a two-inch diameter, tri-clamp circular cap. The cap can be used to limit the distance that the cannula 300 is inserted into the heart, among other uses.

For instance, the cap 314 can also be used to secure the cannula 300 for a clean in place (CIP) procedure.

In various embodiments, the cannula body 318 can be removably attached to cap 314. In such embodiments, the cannula can be sanitized prior to rinsing subsequent animals, or the cannula can be removed and a new cannula attached prior to rinsing a subsequent animal.

In various embodiments, the cannula can have different dimensions. In the embodiment of FIG. 3, the cannula body is from 4-8 inches long, and has a diameter from about 1-1.5 inches. In the embodiment of FIG. 3, the cannula body 318 terminates in an insertion end 320 having an orifice 322. In various embodiments, the orifice is provided in a sharp pointed tip.

The insertion end can also include side ports, in various embodiments. In some embodiments, the side ports (e.g., ports 324) can be pointed forward toward orifice 322 to provide for better clearing of blockages and/or for greater fluid flow during operation, among other benefits. Embodiments may include one or more ports 324, some of which may be pointed forward and some of which may be pointed backward.

In the embodiment illustrated in FIG. 3A, a stationary collar 326 can be affixed to the cannula body 318 near the insertion end 320. In such an embodiment, an anchoring mechanism 328 can be attached to the stationary collar 326 by a hinge mechanism 330. Hinge mechanisms can include a spring hinge, a leaf spring, or a bendable material among other hinge mechanisms.

An outer slide sleeve 332 is slideably mounted on the cannula body 318 to slide along the axis of the cannula body 318 so as to interact with the stationary collar 326 and the anchoring mechanism 328. In various embodiments, such as that shown in FIG. 3A, an actuating end 334 of the slide sleeve 332 includes a rounded portion 333 to facilitate deployment of the anchoring mechanism 328.

In various embodiments of the present disclosure, the anchoring mechanism can be biased to lie flat against cannula body in a closed position. In some embodiments, leaf springs can be used to bias the anchoring mechanism in a closed position. As will be discussed below in connection with FIG. 3C, the anchoring mechanism itself may be a number of leaf springs and/or bendable materials.

Figure 3B:
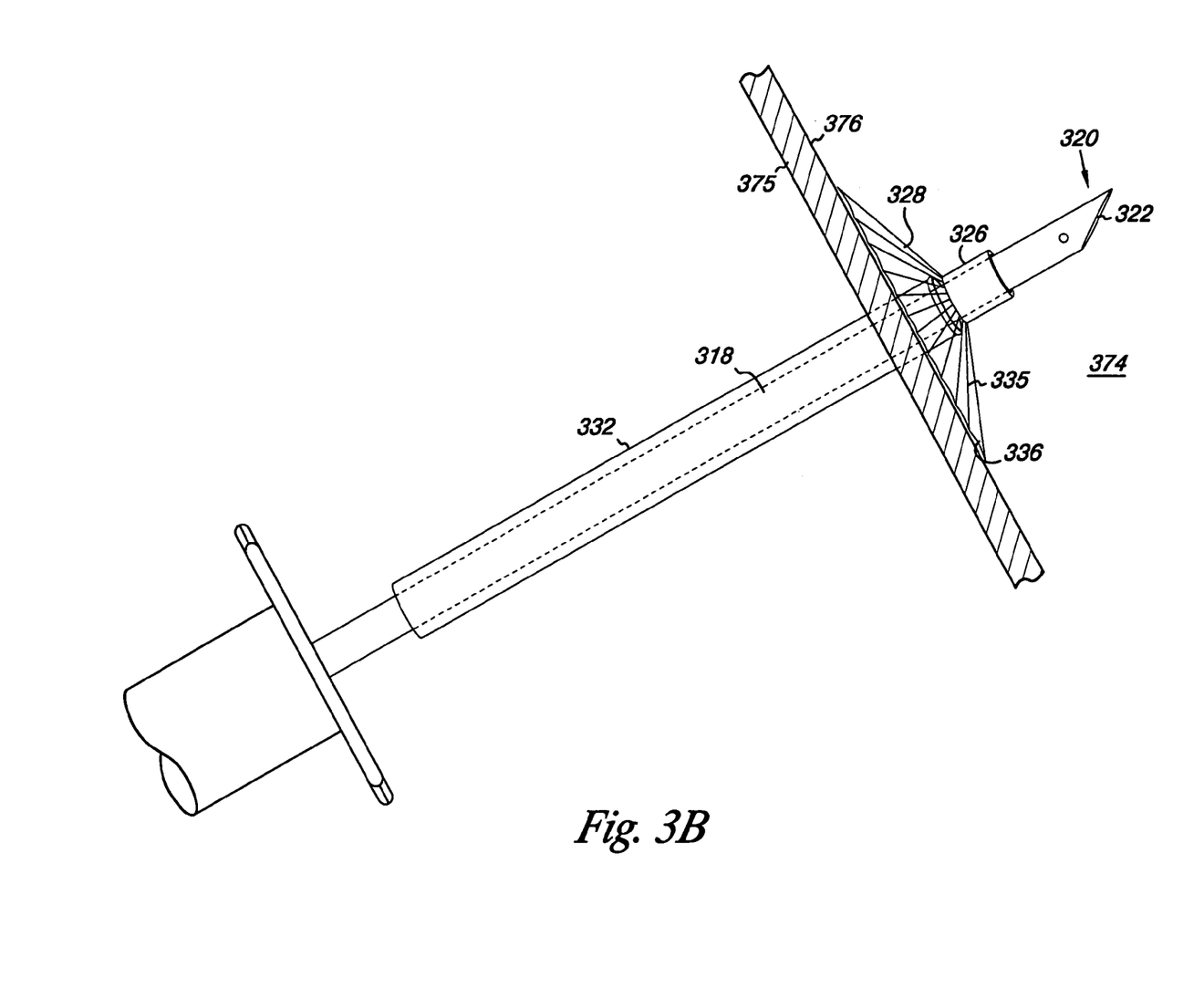
FIG. 3B illustrates the cannula of FIG. 3A having the anchoring mechanism deployed according to an embodiment of the present disclosure.

In the embodiment illustrated in FIGS. 3A and 3B, the anchoring mechanism 328 includes a series of legs 335. The legs 335 may be composed of metal or plastic, among various other materials. For example, the legs can be a flexible metal such as Nitinol.

In some embodiments, the legs 335 have a mesh or webbing 336 between the legs 335. The mesh can serve to restrict backflow of fluid through the inner heart wall 376 or other inner surface of the circulatory system. In other embodiments, the anchoring mechanism utilizes a series of legs spaced closely together without any mesh or webbing.

During operation of the cannula in an automated system (e.g., system 200 of FIG. 2), the valve body receives a flow of fluid. In the embodiment of FIG. 3A, the fluid then flows through the valve body 312 and past the cap 314 into the cannula body 318. From the cannula body 318, the fluid flows out of the orifice 322 and optional side ports 324.

After injection of fluid into the heart is completed, the cannula 300 can be removed from the heart 374 by disengaging the anchor 328 from the inner heart wall 376. The anchoring mechanism 328 may be disengaged by pushing the cannula 300 further into heart 374 and disengaging the slide sleeve 332 from the stationary collar 326 and allowing the hinge 330 to move the anchoring mechanism into a closed position.

In some embodiments, the cannula may be removed from the heart by pulling the heart stick cannula without disengaging the anchoring mechanism by using sufficient force. In such embodiments, the anchoring mechanism (e.g., the metal legs 335) can be folded over the stationary collar.

In some embodiments, the cannula can be disconnected from the automatic insertion device and remain in the animal. Although the embodiment of FIGS. 3A and 3B is described with respect to inserting cannula 300 into the heart of an animal, embodiments are not so limited. For instance, in various embodiments, the cannula 300 can be inserted into various other organs or tubular vessels of an animal to be rinsed.

FIG. 3B illustrates the cannula 300 of FIG. 3A having the anchoring mechanism 328 deployed according to an embodiment of the present disclosure. As illustrated in FIG. 3B, in various embodiments, sliding sleeve 332 serves as an activator to deploy anchoring mechanism 328 to an open position as sleeve 332 is moved against collar 326.

The embodiment of FIG. 3B illustrates the insertion end 320 of cannula 300 inside an animal heart 374. In the embodiment of FIG. 3B, the deployed anchoring mechanism 328 engages a heart wall 375 on the inside 376 of the heart 374. In various embodiments, the deployment of the anchoring mechanism retains the insertion end inside heart during a rinse procedure as discussed above.

In various embodiments, such as that described in FIGS. 3A and 3B, the anchoring mechanism (e.g., anchoring mechanism 328) can be deployable and can be deployed after puncturing the inner heart wall 376 of the animal in order to engage the inner wall of the heart. The actuation mechanism can be provided by various structures. For example, as illustrated in the embodiment of FIGS. 3A and 3B, the actuating mechanism can include an outer slide sleeve 332 which can be moved against a stationary collar 326 to deploy the anchoring mechanism 328. In such embodiments, an actuator (e.g., actuator 294) of an insertion device (e.g., insertion device 290) can automatically deploy the anchoring mechanism.

In some embodiments, such as that shown in FIG. 3B, the actuator can pull back on the cannula an appropriate amount, once the anchor is in the heart, in order to further engage the anchor with the inner heart wall 376. In such embodiments, this motion can better seat the anchor against the heart wall and/or spread out, or splay, the anchor. In embodiments in which the cannula has a deployable anchor (e.g., anchor 328), the actuator can return the anchor to a closed position and can remove the cannula from the heart of the animal.

Figure 3C:
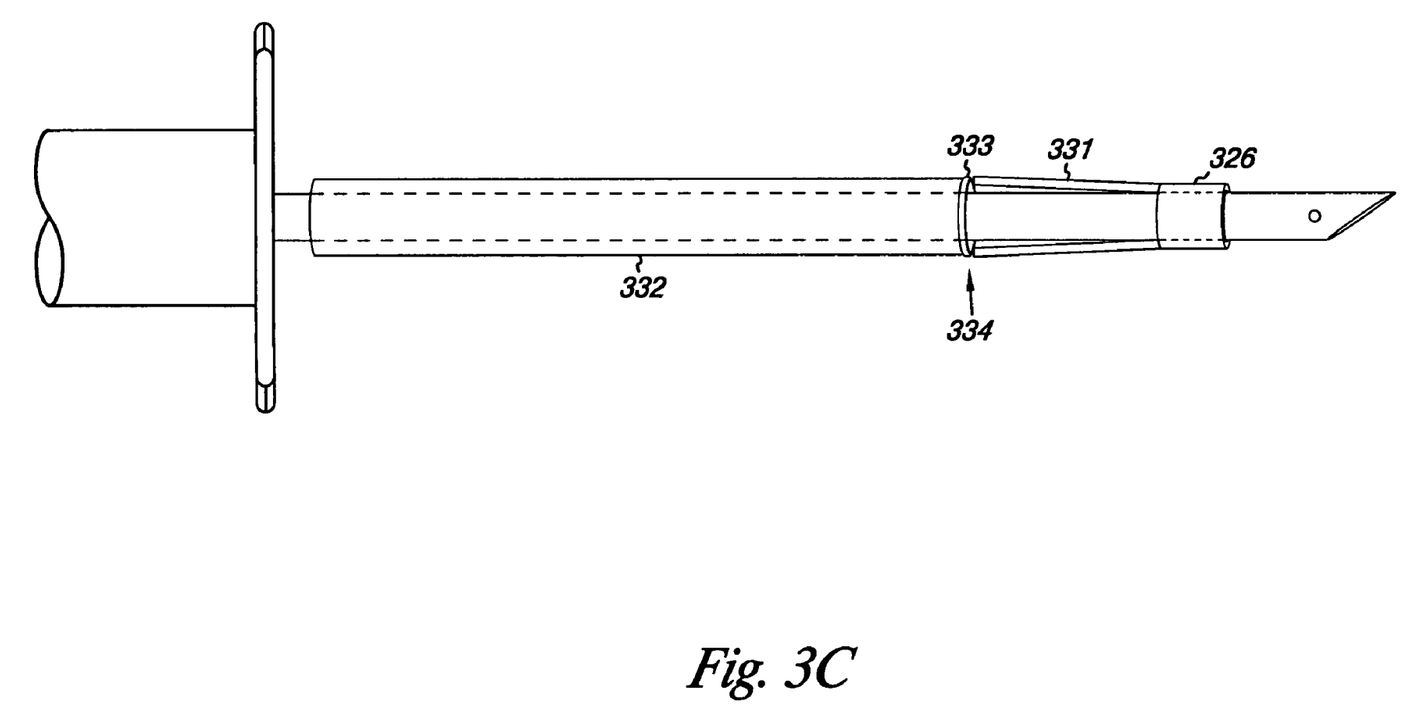
FIG. 3C illustrates a cannula including an anchoring mechanism according to an embodiment of the present disclosure.

FIG. 3C illustrates a cannula including an anchoring mechanism according to an embodiment of the present disclosure. In the embodiment illustrated in FIG. 3C, the anchoring mechanism includes a number of leaf springs 331 attached to stationary collar 326. The cannula includes an outer slide sleeve 332 which serves as an activator to deploy the springs 331 into an open position to retain the insertion end of the cannula in the heart by engaging an inner heart wall during a rinse procedure. In the embodiment of FIG. 3C, an actuating end 334 of the slide sleeve 332 includes a rounded portion 333 to facilitate deployment of the leaf springs.

Figure 3D:
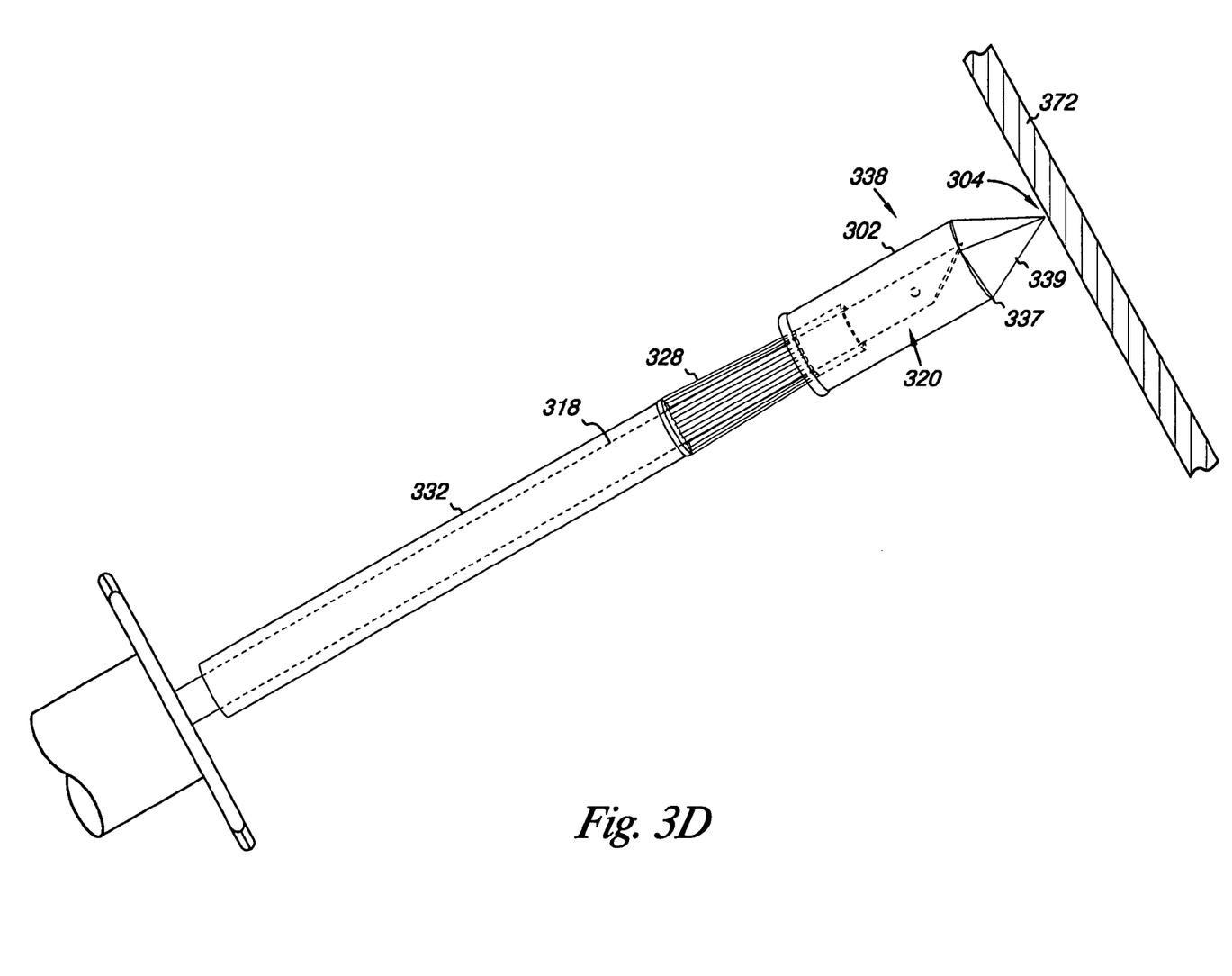
FIG. 3D illustrates the cannula of FIG. 3A including a skin spreader according to an embodiment of the present disclosure.
Figure 3E:
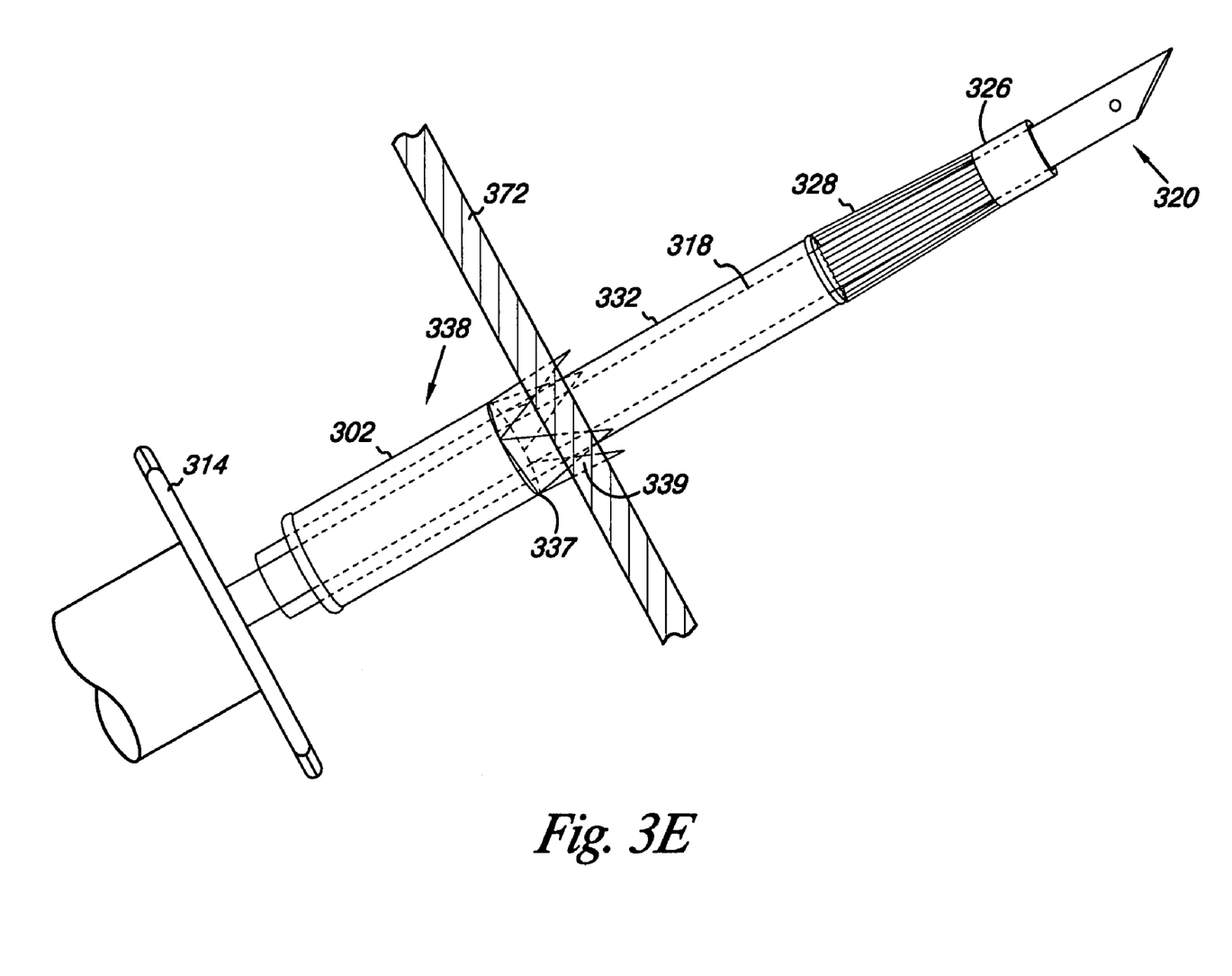
FIG. 3E illustrates the cannula of FIG. 3D after the cannula has entered the body of an animal according to an embodiment of the present disclosure.

FIGS. 3D and 3E illustrate an embodiment of the cannula of FIG. 3A including a skin spreader 338 according to an embodiment of the present disclosure. The embodiment shown in FIG. 3D illustrates the skin spreader 338 prior to insertion of the cannula into the skin 372 of an animal.

The embodiment shown in FIG. 3E illustrates the skin spreader 338 subsequent to insertion of the cannula 300 through the skin 372 of an animal. In the embodiment shown in FIGS. 3D and 3E, the skin spreader 338 is mounted on the cannula body 318 over the insertion end 320. In various embodiments, the skin spreader can be frictionally mounted on the cannula body to allow longitudinal movement of the cannula body therethrough.

The skin spreader 338, shown in the embodiment of FIG. 3D, includes a body 302 and a number of panels 339 forming a skin spreading tip 304. The panels may be attached to the body in various suitable manners that allow them to swing open. For example, the panels 339, of the embodiment of FIGS. 3D and 3E, are attached to body 302 with hinges 337. In some embodiments, the hinges 337 may be made of, or may include springs. In some embodiments, the springs can be over center springs that are biased to spreading to an open position.

For instance, in the embodiment of FIGS. 3D and 3E, the hinges 337 are configured to spread the panels 339 causing the tip 304 to open when pressed against the skin 372 of an animal. Moving the skin 372 can create a sanitary insertion location for the cannula insertion end 320, among other benefits.

For example, a sanitary insertion location can be created as the tip clears away debris from the surface of insertion (e.g., at the insertion location) as it punctures and spreads the skin. Creating a sanitary insertion location in this manner can reduce or eliminate the need to sanitize the insertion location via other methods prior to insertion of cannula tip into the animal.

In various embodiments, the skin spreading tip creates a sanitary insertion location by being forced open by the insertion end of the cannula. In such embodiments, as illustrated in the embodiment of FIGS. 3D and 3E, the cannula can be pressed against the skin 372 at an insertion location causing the skin spreading tip 304 to spread a number of layers of skin 372. The cannula body 318 can then be moved forward causing the insertion end 320 to force the panels 339 open as the insertion end moves through the tip 304 and skin 372 and into the body of the animal. In some embodiments, the spreading tip 304 pierces through the skin 372 prior to the insertion end 320.

In the embodiment shown in FIGS. 3D and 3E, the skin spreader 338 can slide back along cannula body 318 toward cap 314 as the insertion end 320 of the cannula is inserted into the animal. In some embodiments, as shown in the embodiment illustrated in FIG. 3E, a portion of the skin spreader 338 can remain outside of the animal subsequent to insertion of insertion end 320 through the skin 372. In some embodiments, a skin spreading tip can be used at the surface of the heart wall to spread the surface of insertion on the heart wall. In such embodiments, a portion of the skin spreader can remain outside of the heart subsequent to insertion of insertion end through the heart wall.

In various embodiments of the present disclosure, the anchoring mechanism 328, as shown in FIGS. 3D and 3E, can be used in conjunction with the skin spreader 338. For example, the insertion end 320 can be moved through a sanitary opening created by skin spreading tip 304 and into an animal's heart or other location. Upon insertion, the anchoring mechanism 328 can be deployed using outer slide sleeve 332.

Also, it is noted that the skin spreader 338 can be used in conjunction with cannulas and/or anchoring mechanisms other than those shown in FIGS. 3A-3E. For example, skin spreader 338 can be used in conjunction with the cannulas and anchoring mechanisms discussed below in FIGS. 4A and 4B and 5A and 5B.

Figure 4A:
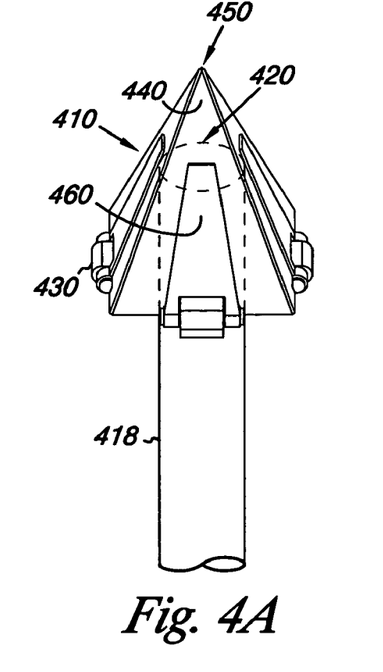
FIG. 4A illustrates a cannula including a tip which serves as an anchoring mechanism according to an embodiment of the present disclosure.
Figure 4B:
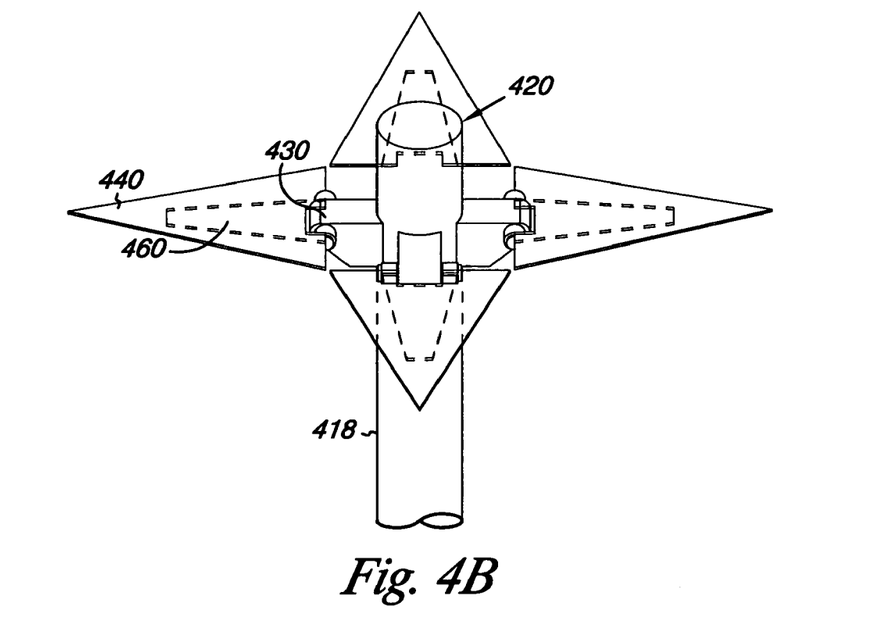
FIG. 4B illustrates the cannula of FIG. 4A in which the anchoring mechanism is deployed according to an embodiment of the present disclosure.

In various embodiments, and as described further in connection with FIGS. 4A and 4B, a cannula can include a piercing anchor 410 that serves as a piercing mechanism and as an anchoring mechanism. In such embodiments, the anchoring mechanism can be deployed from its closed (piercing) position to its open (anchoring) position by the rinse solution being injected through the piercing end of cannula. In such embodiments, a flow controller (e.g., flow controller 296 of FIG. 2) of an automatic insertion device (e.g., automatic insertion device 290 of FIG. 2) may be used to provide a sufficient flow rate of rinse solution through the cannula in order to deploy the piercing anchor 410 to its open position to engage the inner heart wall of a selected animal.

FIG. 4A illustrates a cannula including a tip which serves as an anchoring mechanism 410 according to embodiments of the present disclosure. FIG. 4B illustrates the cannula of FIG. 4A in which the anchoring mechanism 410 is deployed. In the embodiment shown in FIGS. 4A and 4B, the anchoring mechanism 410 is referred to as a piercing anchor because it can both pierce the heart of an animal and be deployed to retain an insertion end of the cannula in the heart during a rinse procedure.

In the embodiment of FIGS. 4A and 4B, the cannula includes cannula body 418 having a first end (e.g., removably attached to a valve body such as valve body 312 shown in FIG. 3A) and having a second end 420 (e.g., an insertion end). In the embodiment illustrated in FIG. 4A, the cannula includes a piercing anchor 410 attached at the second end 420. The piercing anchor 420 includes a number of panels 440 forming a piercing tip 450 when in a closed position as shown in FIG. 4A.

As illustrated in the embodiment of FIG. 4A, the piercing tip 450 is formed forward of the second end 420 when panels 440 are in a closed position. The panels 440 can be hinged and attached to the cannula body 418 by lateral supports 430. Lateral supports 430 can be positioned at a sufficient distance from end 420 such that an appropriate length of cannula body 418 remains in the heart when the anchor 410 is deployed.

Embodiments of the present disclosure can utilize a variety of mechanisms to open and/or maintain the position of one or more of the panels. For example, the embodiment illustrated in FIGS. 4A and 4B include a number of force biased supports 460 attached to the panels 440 to hold the panels in the closed position to pierce the heart with piercing tip 450.

The force biased supports 460 can be configured to open the panels 440 when fluid is injected through the second end 420 of the cannula, among other manners of actuation. That is, injecting fluid through end 420 can be used to deploy the anchoring mechanism 410 by forcing the panels 440 from a closed position as shown in FIG. 4A to an open position as shown in FIG. 4B. When in the open position, the panels 440 can engage an inner heart wall to retain end 420 in the animal heart during the rinse process.

In some embodiments, such as that shown in FIG. 4B, the force biased supports 460 can be bowed leaf springs that snap open upon a sufficient push from fluid flowing through insertion end 420. The springs can also be designed to force bias the panels 440 in a closed position in order to provide a piercing tip (e.g., piercing tip 450 shown in FIG. 4A) which can pierce the heart wall. Flow of fluid through end 420 can cause the springs to deploy panels 440 to a position to engage the heart wall to aid in preventing end 420 from being removed during the rinse.

In various embodiments, the deployed position of the piercing anchor involves a position in which the panels are substantially perpendicular to the cannula body. However, embodiments are not limited to a perpendicular orientation for the panels when the anchor is deployed. For instance, the force biased supports can be configured such that the panels are parallel with the cannula body upon deployment.

In various embodiments of the present disclosure, the cannula can be removed from the heart by pulling the cannula body with sufficient force so as to return the panels to the closed position. In such embodiments, upon removal from the heart, it may be possible for the cannula to be reused for rinsing another animal. In some embodiments, the anchor may be deformed or detached to aid in removal of the cannula.

Figure 5A:
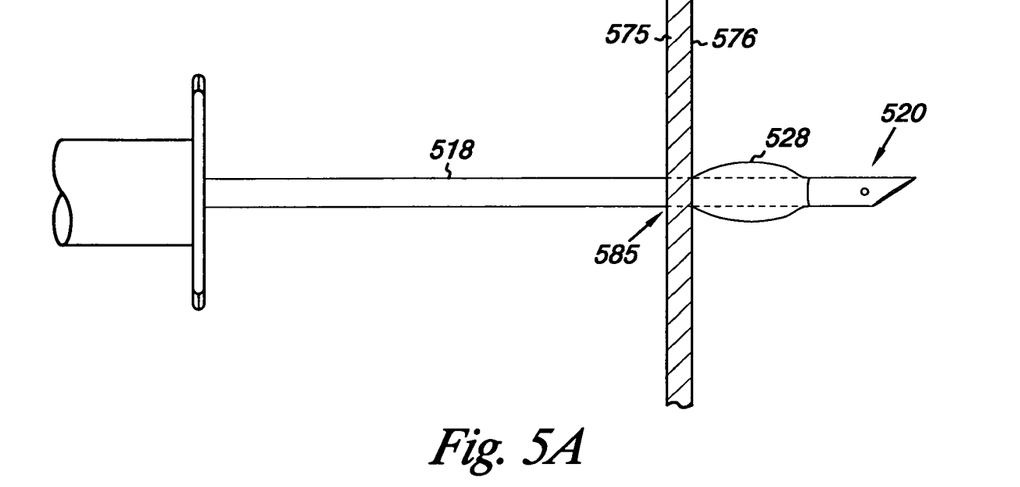
FIG. 5A illustrates another cannula including an anchoring mechanism according to an embodiment of the present disclosure.

FIG. 5A illustrates another cannula 518 including an anchoring mechanism according to an embodiment of the present disclosure. The embodiment illustrated in FIG. 5A shows an anchoring mechanism 580 engaged with the inside 576 of a heart wall 575 upon insertion of insertion end 520 into the heart. In the embodiment illustrated in FIG. 5A, the anchor 580 includes a bulbous protrusion located near insertion end 520 of the cannula.

In various embodiments, the protrusion can be formed on the cannula body. For example, the protrusion can be integrally formed with the cannula or applied to the cannula. In some embodiments, the protrusion can be formed around the entire circumference of the cannula body or on a portion of the circumference. The protrusion can be comprised of metal and/or plastic, among other suitable materials.

Various embodiments can be used when injecting a chilled solution through the insertion end of the cannula and into the heart. In such embodiments, the heart muscle can contract around the cannula body (e.g., cannula body 518). Contraction of the heart wall around the cannula body at the insertion location (e.g., insertion location 585) can create a seal between the anchor and the inner wall. In this manner, the anchor (e.g., the protrusion 580) retains the insertion end in the heart during a rinse procedure and can prevent backflow of fluid through insertion location.

In some embodiments, the protrusion can be expandable and/or retractable. Such embodiments can be accomplished with bands or elongate members (e.g., spars) having one end fixed and one end slidable, with one or more balloons, with chemical reactions, and/or with other suitable mechanisms.

Figure 5B:
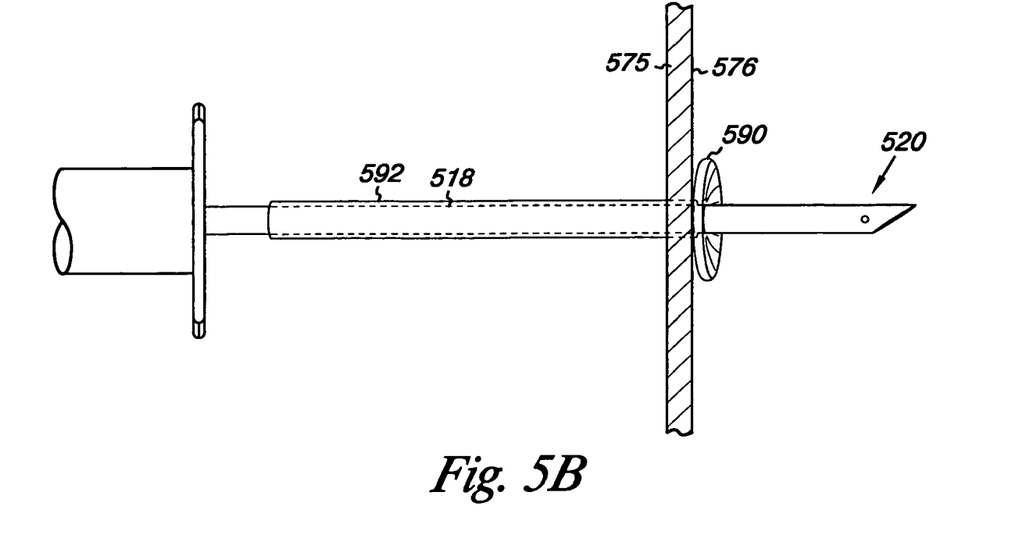
FIG. 5B illustrates another cannula including an anchoring mechanism according to an embodiment of the present disclosure.

FIG. 5B illustrates another cannula including an anchoring mechanism according to an embodiment of the present disclosure. The embodiment illustrated in FIG. 5B shows an anchoring mechanism 590 engaged with the inside 576 of a heart wall 575 upon insertion of insertion end 520 of cannula body 518 into the heart. In the embodiment illustrated in FIG. 5B, the anchor 590 includes an inflatable balloon. In such embodiments, the anchor 590 can be inserted into the heart of the animal and then deployed by inflation through inflation member 592. The shape of the balloon can be any suitable shape.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for meat processing comprising:
    obtaining animal data for an animal selected to have a solution introduced into its circulatory system in a rinsing process;
    determining an insertion location based on the animal data;
    establishing a fluid conduit from a reservoir through the insertion location into the circulatory system of the selected animal by inserting a cannula in fluid communication with the reservoir through the insertion location; and
    activating flow of a solution from the reservoir through the fluid conduit to introduce the solution into the circulatory system of the animal.

2. The method of claim 1, wherein establishing a fluid conduit from a reservoir through the insertion location into the circulatory system of the selected animal includes establishing a fluid conduit from the reservoir through the insertion location into the heart of the selected animal.

3. The method of claim 1, wherein the animal data is an animal type profile.

4. The method of claim 3, wherein obtaining an animal type profile includes:
    selecting an animal type profile associated with the selected animal; and
    obtaining profile data from the animal type profile, wherein the animal type profile includes generalized animal information associated with a particular number of studied animals.

5. The method of claim 4, wherein the generalized animal information includes at least one type of animal information selected from the group including:
    a species;
    a breed;
    a type;
    an age;
    a weight range;
    a general heart location; and
    a prototypical insertion location.

6. The method of claim 3, wherein obtaining an animal type profile includes obtaining a generalized heart location associated with a circulatory system layout of a particular number of studied animals.

7. The method of claim 1, wherein obtaining animal data includes obtaining at least one type of animal data for the selected animal selected from the group including:
    a location of the selected animal;
    an orientation of the selected animal; and
    a length of the selected animal; and
    wherein the method includes obtaining an animal type profile for the selected animal, the animal type profile including a generalized heart location associated with a circulatory system layout of a particular number of studied animals.

8. The method of claim 7, wherein determining an insertion location includes determining an insertion location based on the animal type profile and the animal data.

9. The method of claim 1, wherein the method includes:
    using an optical inspection system to obtain animal data for the selected animal; and
    comparing the animal data with a general heart location of a particular number of studied animals to obtain comparison data.

10. The method of claim 9, wherein using an optical inspection system to obtain animal data for the selected animal includes using a camera to determine a heart location of the selected animal.

11. The method of claim 1, wherein obtaining animal data includes obtaining animal data by using at least one inspection system from the group of inspection systems including:
    a sonic system using a sonic spectrum sensor; and
    a tactile system using a contact sensor; and
    wherein determining an insertion location based on the animal data includes comparing the animal data with a general heart location of a particular number of studied animals to obtain comparison data.

12. The method of claim 1, wherein inserting a cannula in fluid communication with the reservoir through the insertion location includes inserting a cannula having an anchoring mechanism.

13. The method of claim 12, wherein the anchoring mechanism comprises a bulbous protrusion.

14. The method of claim 12, wherein the circulatory system includes a heart and the cannula includes a piercing tip, and wherein the method includes deploying the anchoring mechanism to retain the tip inside the heart during the introduction of the solution.

15. The method of claim 14, wherein the anchoring mechanism comprises a number of flexible legs positioned around a body of the cannula, and wherein deploying the anchoring mechanism includes deploying the anchoring mechanism from a closed position to an open position to engage a heart wall to retain the tip inside the heart.

16. The method of claim 15, wherein deploying the anchoring mechanism to an open position includes using a slide sleeve movably mounted on the cannula body.

17. The method of claim 15, wherein deploying the anchoring mechanism to an open position includes moving an actuating end of the slide sleeve against a stationary collar.

18. The method of claim 17, wherein the method includes removing the cannula from the animal after disengaging the slide sleeve from the stationary collar to return the anchoring mechanism to the closed position.

19. The method of claim 17, wherein the method includes removing the cannula from the animal by folding the anchoring mechanism over the stationary collar.

20. The method of claim 14, wherein retaining the cannula in the circulatory system during the introduction of the solution includes pulling on the cannula in an outward direction to engage the deployed anchoring mechanism with a heart wall.

21. The method of claim 14, wherein activating flow of the solution deploys the anchoring mechanism, and wherein the piercing tip serves as the deployable anchoring mechanism.

22. The method of claim 21, wherein retaining the cannula in the circulatory system during the introduction of the solution includes using a piercing tip comprising a number of hinged panels that when arranged in a closed position form a point to pierce the heart, and wherein the hinged panels are configured such that the flow of solution opens the panels and moves them to a deployed position to engage the heart wall.

23. The method of claim 22, wherein using a piercing tip comprising a number of hinged panels that when arranged in a closed position form a point to pierce the heart includes using hinged panels that are force biased in the closed position and are configured such that the flow of solution opens the panels and moves them to a deployed position to engage the heart wall.

24. The method of claim 1, wherein the method includes inserting a skin spreader slidably mounted to the cannula to allow passage of the cannula therethorough, with interaction between the tip of the skin spreader and a surface of insertion causing the tip of the spreader to spread the surface of insertion.

* * * * *